United States Patent [19]

Gibbins

[11] Patent Number: 5,249,626
[45] Date of Patent: Oct. 5, 1993

[54] BOTTOM HOLE WELL STRAINER

[76] Inventor: Lynn Gibbins, 212 E. Fordyce St., England, Ark. 72046

[21] Appl. No.: 897,097

[22] Filed: Jun. 11, 1992

[51] Int. Cl.$^5$ ............................................. E21B 43/08
[52] U.S. Cl. .................................... 166/235; 210/488
[58] Field of Search ................ 166/235, 227; 210/488, 210/314, 498, 521

[56] References Cited

U.S. PATENT DOCUMENTS

| | | |
|---|---|---|
| 1,705,848 | 3/1929 | Austin . |
| 1,778,371 | 10/1930 | Patton ............................ 166/235 X |
| 2,004,071 | 6/1935 | Hannesschlager ..................... 166/5 |
| 2,159,196 | 5/1939 | Babitch ........................... 210/488 X |
| 2,746,552 | 5/1956 | Grospas .............................. 166/235 |
| 3,568,842 | 3/1971 | Bozek .................................. 210/307 |
| 3,601,192 | 8/1971 | Layne .................................. 166/232 |
| 3,822,744 | 7/1974 | Reijonen et al. .................... 166/235 |
| 4,133,768 | 3/1978 | Theriot ................................ 210/452 |
| 4,752,394 | 6/1988 | McKenzie et al. ................. 210/488 |
| 5,046,892 | 9/1991 | Kothmann .......................... 405/43 |
| 5,100,550 | 3/1992 | Brulhart ........................... 210/498 X |
| 5,122,271 | 6/1992 | Simon et al. ...................... 210/314 |

FOREIGN PATENT DOCUMENTS

| | | | |
|---|---|---|---|
| 530853 | 8/1954 | Belgium ............... | 210/488 |
| 1025729 | 4/1953 | France ................. | 166/235 |

Primary Examiner—Hoang C. Dang
Attorney, Agent, or Firm—Robert R. Keegan; Daniel R. Alexander

[57] ABSTRACT

A well strainer is provided which includes a plurality of stacked, annular, filter segments with each segment including a plurality of elongate, arcuate, threaded rod receiving slots, ramped bearing surfaces near each slot, and position indicators in the vicinity of the ramped bearing surfaces and slots. The gap between adjacent annular filter segments is selected by rotating one segment relative to another to a desired position whereat indicator points are received within respective indicator sockets. Guide members adjacent the ramped bearing surfaces help to keep adjacent filter segments in true superimposed relation. Once the well strainer has been assembled by stacking each of the annular filter segments, one on top of the other in superimposed relation along a common longitudinal axis and securing the stack together by a plurality of threaded rods which extend along the length of the stack, adjustments in the gaps between adjacent filter segments can be made by simply loosening the nuts at one end of the stack to allow the indicator points of one segment to be lifted out of the indicator sockets of an adjacent segment and to relieve the bearing pressure between adjacent segments so that one segment can be rotated relative to another. There is no need to completely disassemble the well strainer in order to adjust the gap between adjacent filter segments.

20 Claims, 4 Drawing Sheets

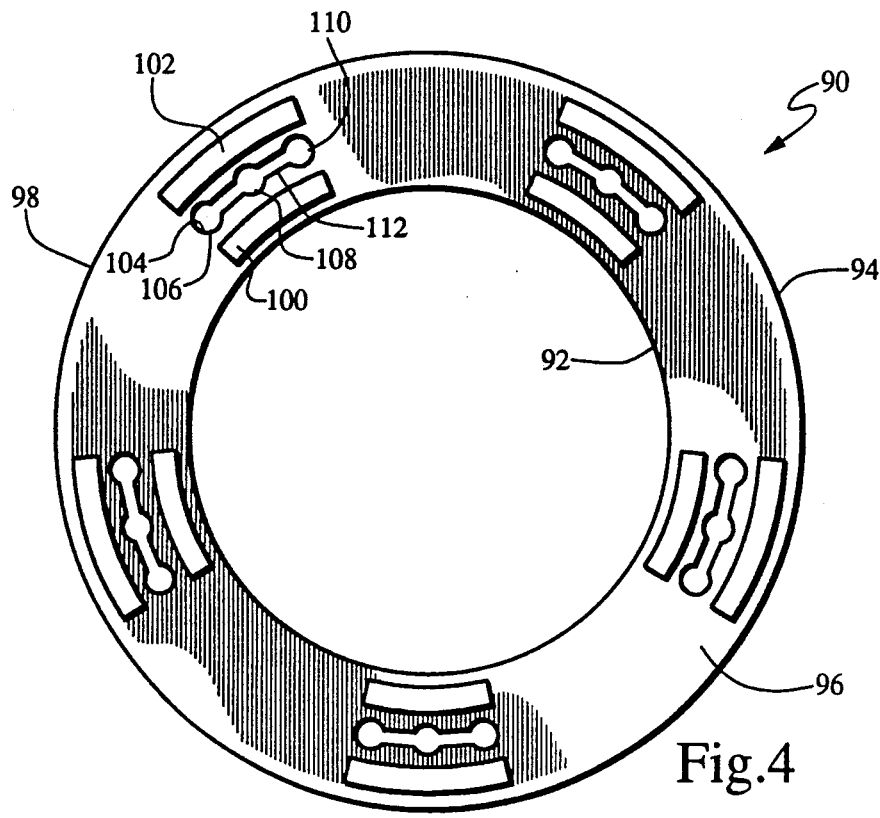
Fig.4
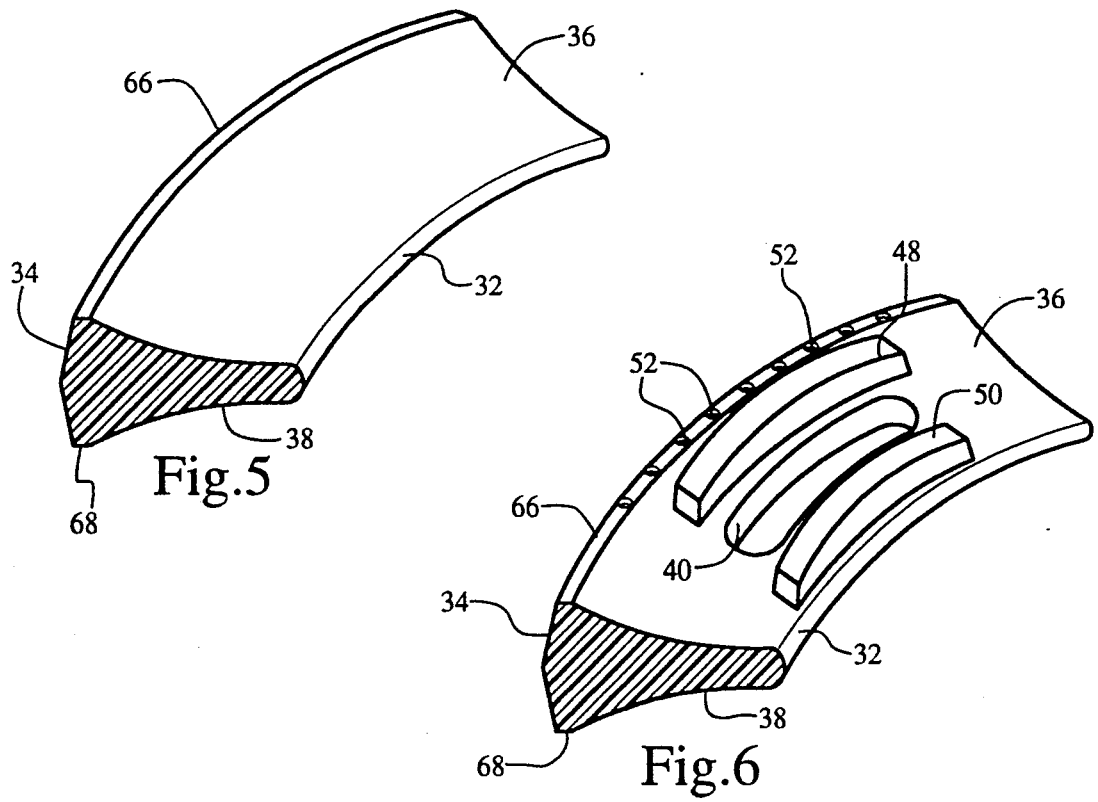
Fig.5
Fig.6

BOTTOM HOLE WELL STRAINER

BACKGROUND OF THE INVENTION

The present invention is directed to well strainers or screens, and more particularly concerns a well strainer composed of a plurality of annular filtering elements stacked on top of one another so as to form a cylindrical filtering structure and spaced from one another for use in filtering fluids such as water, oil, and gas, which are extracted from bores or wells.

Typical well strainers or screens are made up of a plurality of annular filter sections or rings stacked one on top of the other and joined together by long threaded rods extending the length of the stack to form a cylindrical strainer. As described, for example, in U.S. Pat. No. 1,705,848, a well screen includes a plurality of ring like concrete sections arranged in superimposed relation and spaced from one another by having each section provided with a series of depending lugs which rest upon the upper surface of the adjoining section, and thereby define a preset, non-adjustable, gap between sections. Similarly, U.S. Pat. No. 3,822,744 discloses a straining tube composed of a plurality of superimposed rings with each ring having circumferentially arranged spacers and supports which determine a preset, non-adjustable, gap between adjacent rings and provide stability to the structure.

In order to accommodate different well bore conditions (soil, clay, or rock), to filter out different sizes of solid particles, and to extract different fluids, it is desirable to be able to adjust the gap between adjacent rings during construction of the well strainer so that one need not stock a variety of different well strainers or screens to suit various conditions. For example, U.S. Pat. No. 4,752,394 discloses a bore screen which is constructed from stacked rings with the space between the rings being adjustable. Each ring is formed on opposite first and second faces with aligned circumferentially spaced bearing pads. The bearing pads on the first face of successive rings contact those on the second face of adjacent rings and serve to space the rings apart. The bearing pads on the first face of each ring are formed with stepped projections and those on the second face of each ring are formed with complimentary stepped recesses. The stepped projections and stepped recesses associated with respective ones of the bearing pads on each ring are configured differently from the step projections and step recesses associated with others of the bearing pads whereby the spacing between adjacent rings is selected during bore screen assembly by rotating one ring relative to another to bring different pairs of bearing pads into contact with one another. In the specific example shown in the patent, the rings may be stacked and clamped together to form a bore screen having either 0.50, 0.75, or 1.0 mm gap between rings. Each of the bearing pads on the rings has a cylindrical central opening for receiving one of the threaded studs which extend through the stack of rings. In order to provide for three positions of adjustability, each ring has six bearing pads.

Although the bore screen of above-described U.S. Pat. No. 4,752,394 provides for a limited amount of adjustability in the gap between rings and, as such, is an improvement over well screens which do not provide for adjustability, this bore screen arrangement suffers from two major drawbacks. First, the gap between rings must be selected prior to assembly of the screen, and cannot be changed without completely disassembling the screen, that is, removing all of the threaded studs and rotating each ring relative to the other. Second, the large number of bearing pads tends to obstruct the flow of fluid between the rings by reducing the effective filtering area.

Hence, there is a need for an improved well strainer which not only allows for adjustment of the gap between adjacent stacked filter segments prior to assembling the stack but also allows for adjustment of the gap between filter segments after assembly and does so without requiring complete disassembly and which does not unduly reduce the effective filtering area of the strainer.

SUMMARY OF THE INVENTION

In accordance with the present invention, a well strainer is provided which provides for adjustment of the gap between adjacent filter segments both during and following assembly of the strainer and which does so while maximizing the effective filtering area.

In accordance with an exemplary embodiment of the present invention, the well strainer includes a plurality of stacked, annular, filter segments with each segment including a plurality of elongate, arcuate, threaded rod receiving slots, ramped bearing surfaces near each slot, and position indicators in the vicinity of the ramped bearing surfaces and slots. The gap between adjacent annular filter segments is selected by rotating one segment relative to the other to a desired position whereat indicator points are received within respective indicator sockets. Ring guides help to keep adjacent rings in true superimposed relation.

In cross-section, each annular filter segment is an elongated wedge having smooth upper and lower surfaces with the exception of a thin flat filtering surface on the upper and lower outer edges of each segment. Each annular filter segment has a convex circular inner surface defining a cylindrical central opening and facilitating flow.

In accordance with a particular embodiment of the present invention, each of the elongate, arcuate, threaded rod receiving slots has a plurality of preset bolt receiving positions in the form of a plurality of spaced, cylindrical enlargements along the length of the slot. Having such preset bolt locations in each elongate, arcuate, rod receiving slot eliminates the need for indicator points and sockets along the edge of the filter segments.

Once the well strainer has been assembled by stacking each of the annular filter segments, one on top of the other in superimposed relation along a common longitudinal axis and securing the stack together by a plurality of threaded rods which extend along the length of the stack, adjustments in the gaps between adjacent filter segments can be made by simply loosening the nuts at one or both ends of the stack to allow the indicator points of one segment to be lifted out of the indicator sockets of an adjacent segment and the relieve the bearing pressure between adjacent segments to allow rotation of one segment relative to the other. There is no need to completely disassemble the well strainer in order to adjust the gap between each of the filter segments.

A principal object of the present invention is the provision of a well strainer which not only provides for adjustment of the gap between filter segments during strainer assembly but which also allows for adjustment of the gap between filter segments after the well strainer has been assembled.

Another object of the present invention is provision of a well strainer which provides for adjustability of the gap between filter segments without substantially obstructing fluid flow between the segments and, thereby, allowing for maximum fluid flow through the strainer.

A still further object of the present invention is the provision of a well strainer which provides for adjustment of the gap between adjacent filter segments so as to accommodate differing well conditions and prevent solid particles from entering the strainer.

Other objects and further scope of the applicability of the present invention will become apparent from the detailed description to follow taken in conjunction with the accompanying drawings wherein like parts are designated by like reference numerals.

BRIEF DESCRIPTION OF THE DRAWINGS

FIG. 4 is a top plan view of a filter segment in accordance with a still further embodiment of the present invention, FIG. 5 is an enlarged fragmentary perspective representation of a portion of the filter segment of FIGS. 2A and 2B, FIG. 6 is an enlarged fragmentary upper perspective view illustration of the gap adjustment portion of the filter segment of FIG. 2A.

DETAILED DESCRIPTION OF THE PREFERRED EMBODIMENTS

Figure 1:
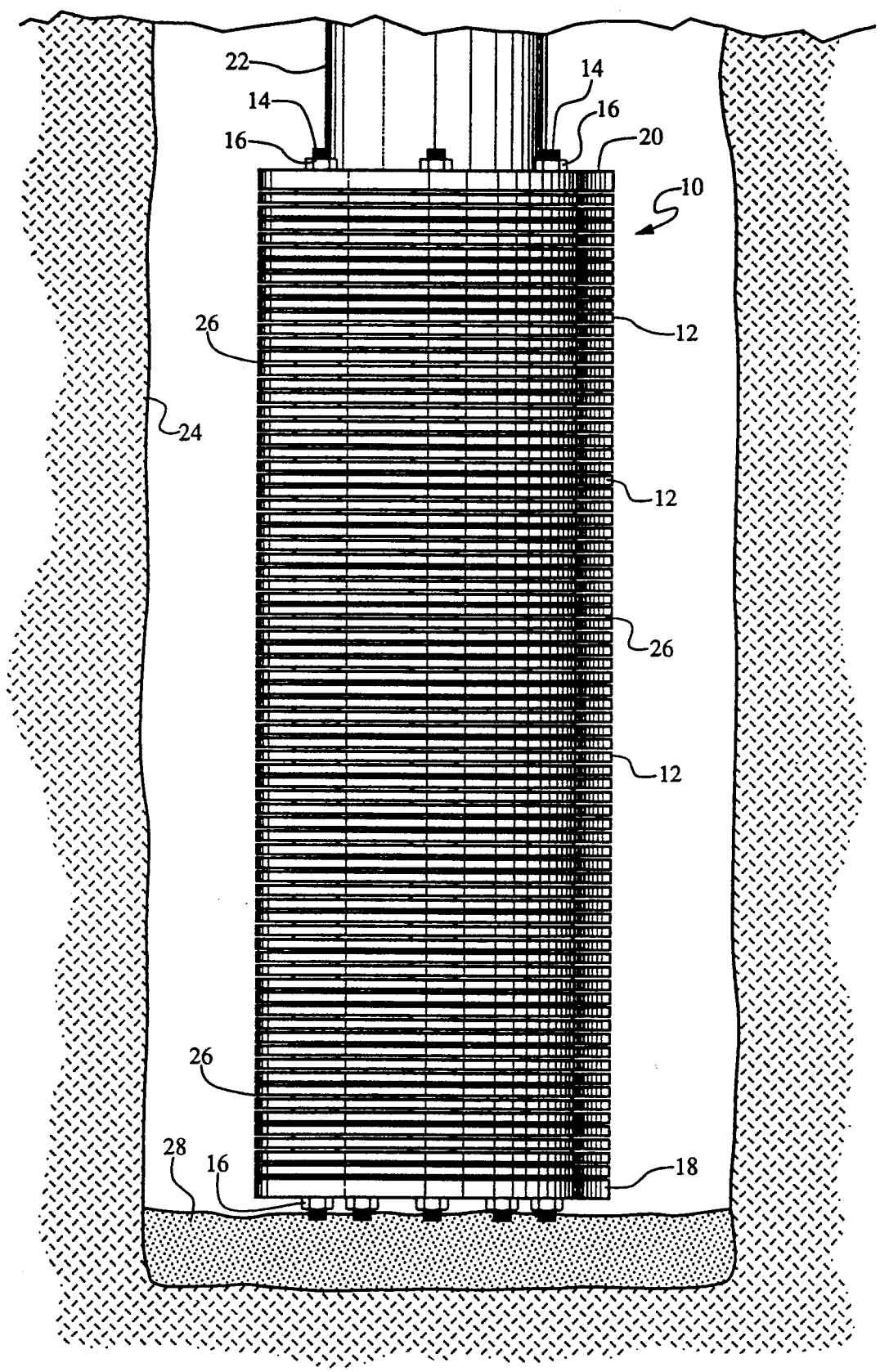
FIG. 1 is a side elevation illustration of a bottom hole well strainer in accordance with an exemplary embodiment of the present invention.

In accordance with an exemplary embodiment of the present invention as shown in FIG. 1 of the drawings, a bottom hole well strainer generally designated by the reference numeral 10 includes a plurality of superimposed annular filter segments or rings 12 held together by a plurality of threaded rods 14 and end nuts 16. The well strainer 10 includes a base 18, such as an end cap, and a top 20, for example, a threaded male adapter which threads into a fluid extraction pipe 22. In a conventional manner, the fluid extraction pipe 22 is connected to a suction pump for extracting fluids from a well bore 24. The upper surface of each of the filter segments 12 is spaced a short distance from the lower surface of an adjacent filter segment so as to provide fluid filtering gaps or spaces 26 between each adjacent filter segments. These filtering spaces or gaps 26 are adjusted to accommodate different well bore conditions and fluids. For example, solid particles such as sand, gravel, or clay are prevented from entering the well strainer 10 and, as such, are filtered from the fluid extracted from the well bore. Suitable filter spacings or gaps range from about 10/1000 to 30/1000 of an inch.

In accordance with one particular example of the present invention, the well strainer is approximately four feet in length and includes between 190 and 200 filter segments held together by three elongate threaded rods and at least six end nuts with each ring having a three inch inner diameter and a three and three-quarter inch outer diameter. Such a well strainer can fit within a four inch pipe or well casing.

Although the exemplary embodiment of FIG. 1 is shown to have an end cap 18 at its base, it is to be understood that both ends of the well strainer 10 may be connected to threaded male adapters so that the well strainer 10 may be located along the length of the extraction pipe 22 as well as at its base.

The well bore 24 may be filled with a granular material 28, such as gravel, following the placement of the well strainer 10 to aid in the prevention of having small particles such as sand or clay come into contact with the filtering spaces 26 between the filter segments 12 and, thus, reduce the possibility of having these filter spacings or gaps 26 clogged and reducing the effective filtering capacity of the well strainer. In the exemplary embodiment shown in FIG. 1 of the drawings, the well strainer is assembled with five elongated threaded rods 14 and, as such, would have filter segments resembling those shown in FIGS. 3 or 4 of the drawings with each segment including five openings, each opening adapted to receive one of the threaded, elongated rods 14.

In accordance with the present invention, it is preferred that the well strainer be assembled using at least three elongated, threaded rods with the number of threaded rods and associated gap adjustment elements being determined by the diameter of the filter segments with larger diameter filter segments requiring more rods and gap adjustment elements. For example, a well strainer made up of filter rings each having a two inch inner diameter and a two and three-quarters inch outer diameter may be assembled using three elongated, threaded rods, for example one-eighth inch stainless steel rods and nuts. Larger size well strainers made up of annular filter segments, having, for example, a six inch outer diameter may require the use of four or more elongated rods, such as, one-eighth inch stainless steel rods and nuts.

It is preferred that the filter segments 12 be constructed of polypropylene having about twenty-five to thirty percent reinforced glass fill. Although polypropylene is the preferred material, other materials such as PVC may be used.

To increase the strength of the assembled well strainer, it is preferred to use a double nut arrangement on each end wherein the elongated threaded rods are inserted through the stack of annular filter segments, a nut on each end of each threaded rod is run down against the upper surface of the upper most filter segment and the lower surface of the lower most filter segment, then the end cap or threaded male adapter is placed over these nuts, and, lastly, another nut is run down on each of the threaded rods and tightened against the exterior surfaces of the threaded male adapter and end cap. This double nut arrangement on each end of the well strainer provides added strength and also allows strainers to be preassembled and shipped in a stacked relation without end caps or threaded male adapters. Final assembly, that is attachment of the well strainer to the fluid extraction pipe via threaded male adapters or the attachment of an end cap, is accomplished at the well site without removing the first set of nuts tightened down against the upper most and lower most filter segments.

Figure 2A:
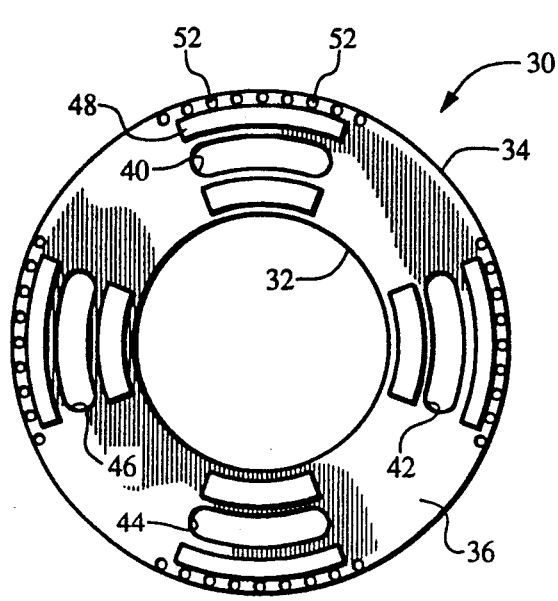
FIGS. 2A and 2B are top plan view and bottom plan views respectively, of a filter segment in accordance with another embodiment of the present invention.
Figure 2B:
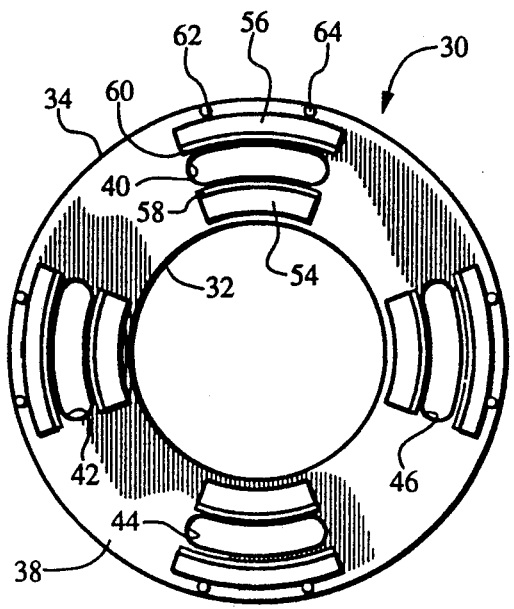

As illustrated in FIGS. 2A and 2B of the drawings and in accordance with a particular embodiment of the present invention, an annular filter segment generally designated by the reference numeral 30 is shown to include inner and outer cylindrical surfaces 32 and 34 and upper and lower surfaces 36 and 38. The filter segment 30 includes four elongate, arcuate, threaded rod receiving slots 40, 42, 44, and 46 circumferentially spaced with equal angles between slots. Each of the slots 40-46 extends through the annular filter segment and provides an opening for receiving one of the threaded rods used to assemble the well strainer and allows for angular adjustment of one filter segment relative to another. Each of the slots 40-46 has a radial dimension slightly larger than the diameter of the threaded rods used to assemble the well strainer. For example, slots 40-46 have radial dimensions of five-thirty seconds of an inch if one-eighth inch threaded stainless steel rods are to be used.

Figure 8:
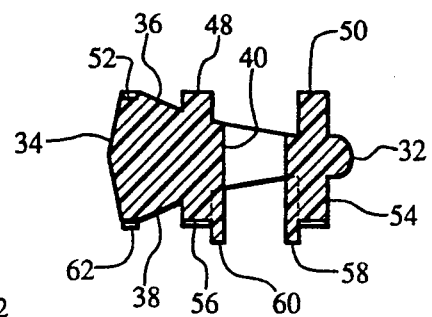
FIG. 8 is a vertical section through the center of one of the gap adjustment areas of the filter segment of FIGS. 2A and 2B.
Figure 9:
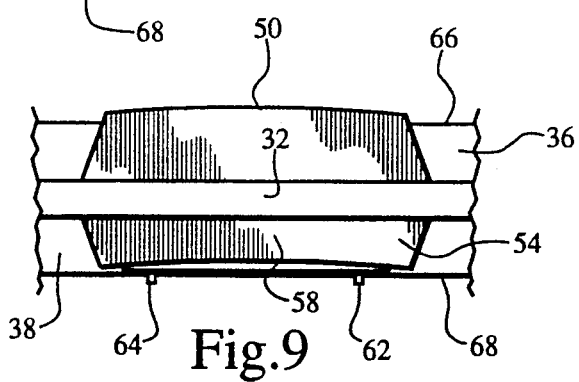
FIG. 9 is a fragmentary side elevation of one of the gap adjustment portions of the filter segment of FIGS. 2A and 2B as viewed from the interior of the filter section.

With particular reference to FIG. 2A of the drawings, adjacent each of the elongate, arcuate rod receiving slots 40-46 are pairs of elongate, arcuate contact wedges 48 and 50 projecting upwardly from upper segment surface 36. Each contact wedge is not only arcuate in that it lies along a circle having a center coaxial with the center of the annular filter segment but also each contact wedge is high at its center and slopes downwardly toward each end to present an arcuate convex surface projecting upwardly from the upper surface of the filter segment (FIGS. 6, 8, and 9). Since each pair of contact wedges 48 and 50 adjacent each slot 40-46 are of like size and shape, only one pair that is the pair being adjacent the slot 40 will be described in detail below.

On the periphery of upper segment surface 36 and adjacent to each of the radially outward contact wedges 48 are sets of nine locator pin receiving sockets 52 adapted to receive locator pins extending from the lower surface of an adjacent filter segment. These nine locator sockets 52 provide for five different angular positions and three different filter gaps between adjacent filter segments, for example, filter gaps of 10/1000, 20/1000, and 30/1000 of an inch between adjacent filter segments. The five different positions correspond to a first, central position with abutting filter segments stacked one on top another with their slots aligned with each other and the other four positions correspond to two adjustment positions to the right (clockwise) and two adjustment positions to the left (counter-clockwise) of the central directly aligned position.

Figure 7:
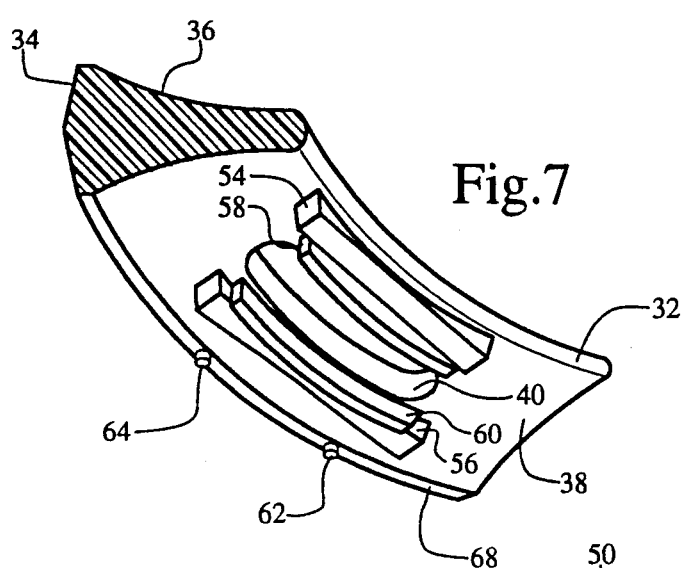
FIG. 7 is an enlarged fragmentary lower perspective view representation of the gap adjustment portion of the filter segment of FIG. 2B.

With reference again to FIG. 2B of the drawings, adjacent each of the slots 40-46 are radially spaced, arcuate, elongate wedge seat pairs 54 and 56 projecting from the lower segment surface 38. Since each of the pairs of wedge seats are of like dimension and shape, only the pair 54 and 56 associated with slot 40 will be described in detail below. Each of the wedge seats 54 and 56 is not only arcuate so as to lie in a circle coaxial with the center of radius of the annular filter segment 30 but also has an arcuate, concave, lower surface which is low at its center and high on each end (FIGS. 7, 8, and 9). This concave lower surface of each of the wedge seats 54 and 56 is dimensioned so as to correspond to and receive the upper convex surface of each of the contact wedges 50 and 48, respectively, when adjacent filter segments are stacked on top of one another with their slots superimposed. Projecting downwardly from the side surface of each wedge seat 54 and 56 adjacent the slot 40 are guide members 58 and 60 which project axially below each of the wedge seats and are adapted to telescopically fit and abut with the inner surface of each of the support wedges 48 and 50 of an adjacent filter segment. These guide members 58 and 60 facilitate axial alignment of adjacent filter segments and insure a truly superimposed relationship.

On the periphery of lower segment surface 38 and adjacent the outer surface of each wedge seat 56 are pairs of spaced, locator pins 62 and 64 which project axially from the lower surface 38. These pairs of locator pins 62 and 64 are adapted to be received within the locator sockets 52 of an adjacent filter segment. The locator pins 62 and 64 provide an indication of the selected angular position and resulting gap between adjacent filter segments and are visible from the exterior of the well strainer. The pairs of locator pins 62 and 64 are spaced from each other and positioned relative to the wedge seats 56 so that, with adjacent filter segments superimposed and having their slots aligned one on top of the other, each of the locator pins 62 and 64 are received within respective third and seventh locator sockets 52, counting locator sockets in a counter-clockwise direction from right to left. In this position, the support wedges and wedge seats are dimensioned so as to provide a 10/1000 of an inch gap between the peripheral upper surface and peripheral lower surface of adjacent filter segments. To adjust the gap between the segments to 20/1000 of an inch, one segment is rotated relative to the other so that locator pins 62 and 64 are positioned in either the second and sixth or fourth and eighth locator sockets 52, again counting sockets from right to left in a counter-clockwise direction. A 30/1000 of an inch gap between adjacent filter segments is selected by rotating one filter segment relative to the other to place locator pins 62 and 64 either the first and fifth or fifth and ninth locator sockets 52, again counting locator sockets from right to left.

The convex support wedges and concave wedge seats are double angle in that they provide for equal gap adjustment between filter segments by rotating one segment relative to the other either to the right or left (clockwise or counter-clockwise) by the same amount. This double angle arrangement is necessary so that the slots of superimposed filter segments are kept in substantial alignment to allow the threaded rods to extend throughout the entire length of the well strainer. For example, to provide a 30/1000 of an inch gap between adjacent filter segments throughout the entire length of the well strainer one needs to first rotate the first overlying filter segment to the right or clockwise relative to the base segment, and then rotate the next superimposed filter segment to the left, counter-clockwise relative to the base segment, so as to keep a sufficient amount of the slots in superimposed overlying relation and allow passage of the threaded rods throughout the length of the well strainer. Once the well strainer is assembled with preselected gaps between adjacent filter segments, it is possible to adjust the filter spacing or gaps between filter segments by simply loosening the nuts at one end of the well strainer sufficiently to allow for relocation of the locator pins to different locator sockets in an adjacent filter segment. It is not necessary to totally disassemble the well strainer of the present invention in order to adjust the gap between adjacent filter segments.

With particular reference to FIG. 5 of the drawings, there is shown a portion of the filter segment 30 between adjacent arcuate slots whereat the upper and lower surfaces 36 and 38 are substantially smooth with the exception of a thin flat filtering surface 66 and 68 at the periphery of each of the upper and lower surfaces 36 and 38. The inner, circular surface 32 of the filter segment 30 is convex to enhance fluid flow through the well strainer. The inner, cylindrical surfaces 32 of each of the superimposed filter segments 30 defines a cylindrical inner cavity within the well strainer. As can be seen from the cross-section through the filter segment 30, the body of the segment is substantially wedge shaped in that it tapers down from a wider outer periphery at the outer surface 34 to a thin inner dimension near the inner surface 32. The substantially smooth upper and lower surfaces 36 and 38 facilitate fluid flow over the filter segment. Further, the downward taper of the upper surface 36 from the outside to the inside of the wedge segment facilitates the passage of any solid particles which may enter the well strainer to move from the outer surface 34 to the inner surface 32 and fall down within the inner cylindrical cavity of the well strainer. The smooth portion of the upper and lower surfaces 36 and 38 is maximized, that is the obstruction to these surfaces is minimized so as to maximize the effective filtering area of each filter segment 30 and, thereby, maximize the fluid extraction capacity of the well strainer.

As illustrated in FIG. 6 of the drawings, each of the locator sockets 52 is located within the flat filtering annulus 66 in the upper segment surface 36. Likewise, each of locator pins 62 and 64 projects downwardly from the flat filtering annulus 68 in the lower segment surface 38. The number of slots and associated adjustable gap elements on each filter segment is kept at a minimum so as to provide the least obstruction to fluid flow between filter segments and, thereby, maximize fluid extraction while at the same time providing the necessary stability and strength to the well strainer. For example, a three and three-quarter inch outer diameter well strainer having filter segments with three inch inner diameter openings and three and three-quarter inch outer diameter surfaces only requires the use of three circumferentially spaced threaded rod receiving slots, three pairs of wedge supports and wedge seats, and three sets of locator pins and sockets.

Figure 3:
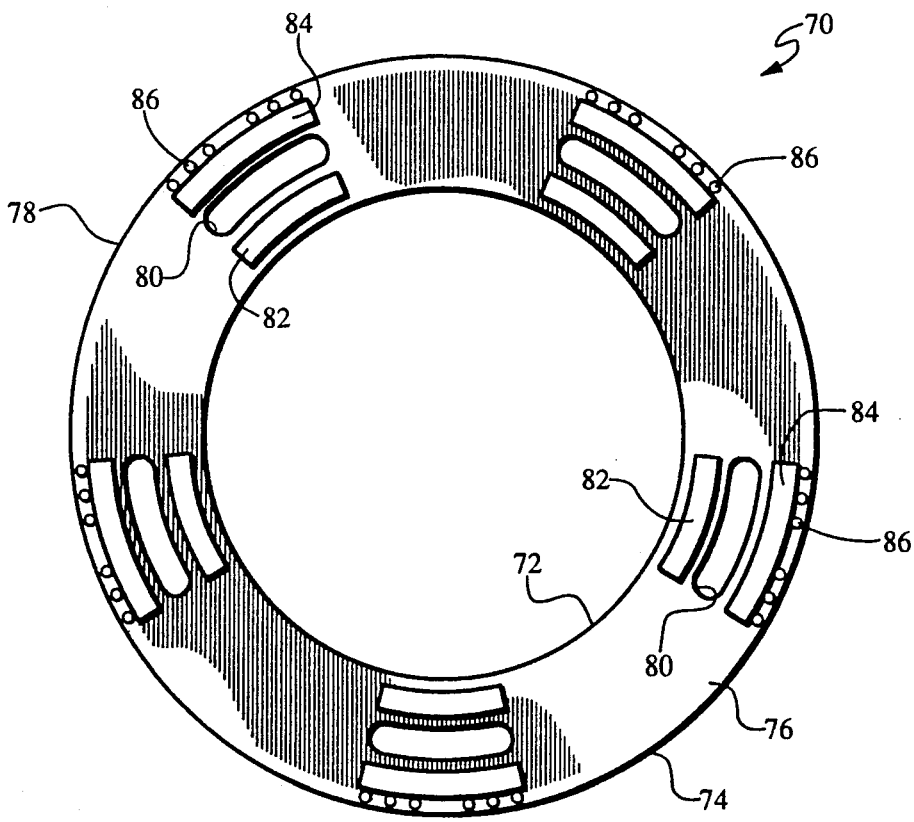
FIG. 3 is a top plan view representation of a filter segment in accordance with yet another embodiment of the present invention.

As illustrated in FIG. 3 of the drawings and in accordance with another embodiment of the present invention, an annular filter segment or ring is generally designated by the reference numeral 70 and shown to include cylindrical inner and outer surfaces 72 and 74 and upper and lower surfaces 76 and 78. A plurality of circumferentially spaced, arcuate, elongate slots 80 extend axially through filter segment 70 and are adapted for receiving elongate threaded rods which secure a stack of superimposed filter segments 70 into a well strainer. Extending from the upper surface 76 adjacent each of the arcuate slots 80 are pairs of radially spaced support wedges 82 and 84. In the periphery of upper surface 76 and adjacent the support wedges 84 are sets of six locator sockets 86 adapted to receive locator pins extending from the lower surface of an adjacent filter segment.

The filter segment 70 is similar to the filter segment 30 of FIGS. 2A and 2B except that filter segment 70 is larger in diameter and, therefore, adapted for use with five elongate threaded rods and is designed to only provide for three different angular positions of adjacent filter segments and for two different gaps between segments. Although it is not shown in the drawing, it is to be understood that five pairs of two locator pins project from the lower segment surface 78 opposite the second and fifth locator sockets 86 of each set of six sockets, counting sockets from right to left (counter-clockwise). Thus, the pairs of locator pins and the sets of six locator sockets 86 provide for a center, truly superimposed position, a second position rotating the segment clockwise, and a third position rotating the segment counterclockwise.

Also, projecting from the lower surface 78 are pairs of radially spaced wedge seats and guide members adjacent each slot 80. Each of the support wedges 82 and 84 have convex upper surfaces like those of the support wedges 48 and 50 of filter segment 30 (FIG. 6). Each of the wedge seats of filter segment 70 have concave lower surfaces similar to those of the wedge seats 54 and 56 of filter segment 30 (FIG. 7). Again, the obstruction to the smooth upper and lower surfaces 76 and 78 of filter segment 70 is kept at a minimum, that is, keeping the number and length of slots 80, support wedges 82 and 86, and wedge seats to a minimum so as to maximize the fluid filtering capacity of a well strainer constructed of a plurality of superimposed filter segments 70.

As represented in FIG. 4 of the drawings, and in accordance with yet another embodiment of the present invention, an annular filter segment generally designated by the reference numeral 90 is shown to include cylindrical inner and outer surfaces 92 and 94 and upper and lower surfaces 96 and 98. Like filter segments 30 and 70, filter segment 90 includes a plurality of circumferentially spaced pairs of support wedges 100 and 102, projecting upwardly from the upper segment surface 96. Likewise, filter segment 90 includes circumferentially spaced pairs of wedge seats projecting from lower segment surface 98. Again, the upper surface of each of the support wedges is convex and the lower surface of each of the wedge seats is concave.

Filter segment 90 differs from filter segments 30 and 70 in that it does not include locator pins and sockets, but instead has a plurality of circumferentially spaced, elongate, arcuate, openings 104, each including a plurality of threaded rod receiving nodes or positions 106, 108, and 110, which serve to indicate the desired annular position of one filter segment relative to another. Each of the nodes 106, 108, and 110 is a substantially cylindrical opening and has a diameter slightly larger than the diameter of the threaded rod used to assemble the well strainer. Each of the nodes is connected with an adjacent node by an elongated, arcuate opening having a radial dimension slightly less than the diameter of the threaded rods. The filter segment 90 is constructed of a plastic material sufficiently resilient to allow the threaded rod to be inserted through a particular node, and then have the segment rotated relative to the rod to position the rod in another node. The annular filter segment 90 is designed to accommodate five elongated threaded rods, provides three angular positions between adjacent filter segments, and provides for two different filter spacings or gaps between adjacent segments. For example, with adjacent segments axially aligned with the rod receiving nodes, support wedges, and wedge seats of adjacent segments truly superimposed, a gap of 10/1000 of an inch is provided between the upper surface of one segment and the lower surface of the adjacent segment. By adjusting one segment relative to the other, either one position to the right or one position to the left, a gap of 20/1000 of an inch is provided between adjacent segments. Again, the adjustment made by either rotating the segment to the right or to the left of a central truly superimposed position provides for the same adjustment of gap between segments so that segments are alternately rotated right and then left to allow the threaded rods to extend the entire length of the well strainer.

Although the filter segments 70 and 90 of FIGS. 3 and 4 are shown to provide three different angular positions and two different filter gaps between adjacent filter segments, it is to be understood that a greater number of angular positions and filter gaps can be accommodated by either increasing the number of locator sockets 86 or reducing the number of pins in filter segment 70 and by increasing the number of threaded rod receiving nodes in filter segment 90.

A well strainer constructed of filter segments, in accordance with the present invention, provides for efficient fluid extraction in that the gap between adjacent filter segments can be adjusted to accommodate different well bore conditions and to extract different fluid types and viscosities, maximizes the filtering capacity by minimizing the obstruction to the upper and lower surfaces of each filter segment, and allows for selection of the gap between filter segments, not only during assembly of the well strainer but also following assembly by loosening one end of the well strainer and rotating adjacent filter segments one relative to the other. Additionally, each of the filter segments of the present invention provides an indication of the selected filtering gap by either locator pins and sockets or threaded rod receiving nodes which make it easier to construct the well strainer with the proper gap between adjacent filter segments.

Although the present invention as described above and shown in the drawings is directed to a bottom hole well strainer, it is to be understood that the well strainer of the present invention may be located at the bottom or anywhere along the length of a fluid extracting pipe, and that a plurality of well strainers may be used in combination along the length and at the bottom of a pipe for extracting fluid at a number of selected depths in a well hole.

Thus, it will be appreciated that as a result of the present invention, a highly effective improved well strainer is provided by which the principal objective, among others, is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. A well strainer for extracting fluids from a well and filtering solid particles from the fluids during extraction comprising:

a cylindrical stack of annular filter segments joined together in superimposed relation along a common longitudinal axis by a plurality of threaded rods with locking means at each end of said rods, each of said filter segments having a plurality of adjustable spacing means for providing at least two selectable filter spacings between adjacent filter segments, each of said adjustable spacing means including an arcuate, elongate slot for receiving one of said threaded rods, sloped contact means for contacting an adjacent filter segment and defining the filter spacing therebetween, and locator means for indicating the selected one of at least two selectable filter spacings.

2. The well strainer as recited in claim 1 wherein each of said slots has a plurality of rod placement positions defined by substantially circular openings each having a diameter greater than the diameter of said rods and being interconnected by an arcuate slot segment having a radial dimension slightly less than the diameter of said threaded rods.

3. The well strainer as recited in claim 1 wherein each of said slots has a radial dimension greater than the diameter of said rods.

4. The well strainer as recited in claim 1 wherein each of said filter segments has upper and lower surfaces and said sloped contact means includes first and second radially spaced, arcuate contact wedges projecting from one of the upper and lower surfaces of said filter segment near each of said arcuate slots.

5. The well strainer as recited in claim 4 wherein said sloped contact means further includes first and second radially spaced, arcuate wedge seats projecting from the other of said upper and lower surfaces of said filter segment near each of said arcuate slots.

6. The well strainer as recited in claim 5 wherein said sloped contact means further includes a pair of arcuate guide members for aligning said filter segments in coaxial, superimposed relation and for positioning said contact wedges of one filter segment in abutting relation with said wedge seats of an adjacent filter segment.

7. The well strainer as recited in claim 6 wherein said locator means of said adjustable spacing means includes at least one locator pin extending from one of said upper and lower surfaces of said filter segment and a plurality of locator pockets in the other of said upper and lower surfaces in a position to receive the locator pin of an adjacent filter segment.

8. The well strainer as recited in claim 1 wherein each of said filter segments has smooth, curved upper and lower surfaces for facilitating fluid flow, said smooth surfaces being interrupted by a small, flat, filtering annulus adjacent the outer edge of each upper and lower segment surface and by said adjustable spacing means.

9. The well strainer as recited in claim 8 wherein each of said filter segments has a convex inner surface defining a cylindrical central opening in said well strainer.

10. The well strainer as recited in claim 4 wherein each of said contact wedges comprises an elongate, convex wedge high at its center and sloping downwardly towards each of its ends.

11. The well strainer as recited in claim 5 wherein each of said wedge seats comprises an elongate, concave wedge seat low at its center and high toward each of its ends.

12. The well strainer as recited in claim 11 wherein said wedge seats further include a pair of arcuate, elongate guide members projecting therefrom and adapted to abut a side surface of each of the contact wedges of an adjacent filter segment.

13. An annular filter segment for use in a well strainer comprising:
   a ring shaped body having upper and lower surfaces, inner and outer edges, and a cross-section which is thick near the outer edge and tapers downwardly toward the inner edge,
   a plurality of circumferentially spaced, arcuate, elongate slots each adapted for receiving a threaded rod,
   a plurality of circumferentially spaced pairs of contact wedges projecting from one of the upper and lower surfaces of said filter segment, and
   a plurality of circumferentially spaced pairs of wedge seats projecting from the other of said upper and lower filter segment surfaces.

14. The filter segment as recited in claim 13 wherein each of said slots has a plurality of rod placement positions defined by substantially circular openings each having a diameter greater than the diameter of said rods and being interconnected by an arcuate slot segment having a radial dimension slightly less than the diameter of said threaded rods.

15. The filter segment as recited in claim 13 wherein each of said slots has a radial dimension greater than the diameter of said rods.

16. The filter segment as recited in claim 15 further comprising locator means near each of said slots for indicating a selected one of at least two selectable filter spacing settings.

17. The filter segment as recited in claim 16 wherein said locator means comprises at least one locator pin projecting from one of said upper and lower segment surfaces and at least two, circumferentially spaced, locator sockets in the other of said upper and lower surfaces adapted to receive the locator pin of an adjacent filter segment.

18. The filter segment as recited in claim 17 wherein said upper and lower filter segment surfaces is smooth for facilitating fluid flow, said smooth surfaces being interrupted by a small, flat, filtering annulus adjacent the outer edge of each upper and lower segment surface and by said slots, contact wedges and wedge seats, and wherein said inner surface of said filter segment is convex.

19. The filter segment as recited in claim 18 wherein each of said contact wedges comprises an elongate, convex wedge high at its center and sloping downwardly towards each of its ends, wherein each of said wedge seats comprises an elongate, concave wedge seat low at its center and high toward each of its ends, and wherein one of said pairs of wedge seats and contact wedges further include a pair of arcuate, elongate guide members projecting therefrom and adapted to abut a side surface of each of the other one of said pairs of wedge seats and contact wedges of an adjacent filter segment.

20. In a well strainer composed of a stack of superimposed, annular, filter segments joined together by a plurality of threaded rods, the improvement comprising:
   each segment having a plurality of circumferentially spaced, elongate, arcuate, threaded rod receiving openings providing for rotational adjustment of adjacent filter segments about a common longitudinal axis.

* * * * *